US007562728B1

(12) United States Patent
Voigt

(10) Patent No.: US 7,562,728 B1

(45) Date of Patent: Jul. 21, 2009

(54) POWERED WHEELCHAIR

(76) Inventor: Allan Alfred Voigt, 400 Breezewood Dr., Geyserville, CA (US) 95441

( * ) Notice: Subject to any disclaimer, the term of this patent is extended or adjusted under 35 U.S.C. 154(b) by 210 days.

(21) Appl. No.: 11/580,333

(22) Filed: Oct. 12, 2006

(51) Int. Cl.
*B62B 5/02* (2006.01)

(52) U.S. Cl. ......................... 180/65.1; 180/22; 180/907

(58) Field of Classification Search ................... 180/22, 180/24.01, 65.1, 907, 908
See application file for complete search history.

(56) References Cited

U.S. PATENT DOCUMENTS

| | | | | | |
|---|---|---|---|---|---|
| 4,119,163 | A | * | 10/1978 | Ball | 180/6.5 |
| 4,455,029 | A | * | 6/1984 | Taylor | 280/5.28 |
| 4,545,593 | A | * | 10/1985 | Farnam | 280/250.1 |
| 4,926,952 | A | * | 5/1990 | Farnam | 180/6.5 |
| 5,020,818 | A | * | 6/1991 | Oxford | 280/250.1 |
| 5,395,129 | A | * | 3/1995 | Kao | 280/5.22 |
| 5,842,532 | A | * | 12/1998 | Fox et al. | 180/6.48 |
| 5,904,214 | A | * | 5/1999 | Lin | 180/15 |
| 7,316,405 | B2 | * | 1/2008 | Kritman et al. | 280/5.22 |
| 7,363,994 | B1 | * | 4/2008 | DeFazio et al. | 180/22 |

* cited by examiner

*Primary Examiner*—Christopher P Ellis
*Assistant Examiner*—Brian Swenson
(74) *Attorney, Agent, or Firm*—Risto A. Rinne, Jr.

(57) ABSTRACT

An apparatus for urging a person of limited physical ability from a first location to a second location includes a self-propelled type of wheelchair that has two driven wheels disposed under the chair. A pair of preferably front-disposed castors is included. Together, the pair of castors and the two driven wheels define a first plane that the wheelchair is disposed on when the wheelchair is on a level surface. A pair of additional driven wheels is provided that are elevated with respect to the first plane. The additional driven wheels can be disposed either in front of or behind the two driven wheels. Together, the two driven wheels and the pair of additional driven wheels define a second plane. When the wheelchair is disposed along a sufficient incline, it tilts from the first plane into the second plane. At that time, contact with the surface is made by the pair of additional driven wheels, whereby the pair of additional driven wheels provides an additional motive force to help propel the wheelchair.

14 Claims, 4 Drawing Sheets

POWERED WHEELCHAIR

BACKGROUND OF THE INVENTION

1. Field of the Invention

The present invention, in general, relates to medical prosthetic devices and, more particularly, to self-propelled wheelchairs.

Wheelchairs are well-known devices that are used by those suffering from many types of infirmities that prevent or impede their mobility.

There are two basic types of wheelchairs; manually propelled and self-propelled. Manually-propelled wheelchairs are used by those who generally still retain some hand and arm capability sufficient to propel the wheelchair.

Self-propelled wheelchairs are used by those with limited personal ability to propel the wheelchair. These types of users typically include those people who have some type of a spinal injury, for example those who by their injury are either paraplegic or quadriplegic.

Others who suffer from amputations and other injuries or infirmities that restrict their ability to manually propel a wheelchair may also use self-propelled types of wheelchairs.

Additionally, those who like to travel extended distances on their wheelchairs, for example to a neighborhood grocery store, may lack the stamina to use a manually propelled wheelchair for longer distances. This is especially true when they are returning with groceries and must now transport an increased weight.

Others who like to go for extended "walks" either alone or with ambulatory friends may find that they cannot maintain a reasonable pace if using a manually propelled type of wheelchair. Accordingly, they may prefer to also use a self-propelled type of wheelchair.

The use of self-propelled wheelchairs is based generally on matters of necessity or of preference. However, the use of a self-propelled type of wheelchair is always intended to augment quality-of-life issues for the user.

The instant invention appertains to improvements in self-propelled types of wheelchairs. These are also generally referred to a "power" wheelchairs or "powered" wheelchairs. They may also be referred to by other names. The discussion hereinafter is directed to self-propelled (i.e., powered) types of wheelchairs.

Ideally, a wheelchair should provide maximum mobility under the widest range of circumstances. The user should feel comfortable in his or her ability to maneuver the wheelchair whether inside or outside, on carpet, tarmac, concrete, gravel, or dirt. This is the ideal. The greater the comfort of the user, the greater use will be given to the wheelchair. Accordingly, quality of life will be respectively improved.

However, certain design parameters have heretobefore limited the versatility of prior art types of wheelchairs. As a result, compromise in versatility and applicability has been the norm for wheelchair users. Wheelchair designers have had to make a primary decision as to whether the wheelchair will be used primarily inside or outside. On this basis, compromises in the design of the wheelchair were made that augmented its intended primary application but which also detracted from other applications.

It is from a more intimate understanding of the problems that those who must use wheelchairs experience that a corresponding understanding of the design compromises that prior art types of wheelchairs have been forced to make can occur. It is also only from that same understanding that the benefits of the instant invention can be fully grasped and appreciated.

Therefore, it is necessary to discuss both the needs of the (self-propelled type of) wheelchair user, in particular those persons suffering from spinal injuries and other infirmities that greatly restrict the user's mobility, along with the limitations inherent with prior art wheelchair design.

For example, it is virtually certain that the wheelchair will, at times, need to be used inside a domicile. The person using the wheelchair will need to maneuver around furniture, approach a dining table, back away from the dining table and rotate the wheelchair to face away from the dining table, then move through corridors, doorways, enter into bathrooms, maneuver about in a typically tight space, and then exit from the bathroom.

When designing a wheelchair for use in a residence (domicile) space constraints become of paramount concern. In particular, the turning radius of the wheelchair becomes an important consideration as well as the location of a vertical axis (or axes) about which the wheelchair pivots or sweeps.

Wheelchairs turn primarily by differentially driving a pair of drive wheels in opposite directions as controlled by a joystick or other input device. Depending on the severity of injury or infirmity and the limitations so caused, even the use of a joystick is not an option for some spinal injury (and other) sufferers. Therefore, other types of sensors have been designed to respond to various types of motion that the user inputs into the sensors. These types of inputs are generally known.

While the instant invention is applicable for use with both joystick and other types of input, it is important to understand and appreciate that the wheelchair turns in response to an input provided by the user. This input may be proportional to the subtle motion of a joystick or it may be somewhat crude in nature. Regardless, the ability of the wheelchair to carve a tight circle (i.e., to have a short turning radius) is especially advantageous to use indoors.

Similarly, the indoor wheelchair needs to be low enough to pass under a dining or kitchen table. An inch lower seat height can make a difference in versatility. Similarly, the narrower the width of the wheelchair, the easier it is to pass through narrow doorways. In any given home, certain doors tend to be wider than others, for example main entry doors, while other doors tend to be narrower, for example closet doors and bathroom doors.

If the wheelchair is wider than the opening, then the opening must be expanded at substantial expense or passage becomes impossible. This clearly affects quality of life.

Similarly, corridors can be narrow with "L-shaped" turns that tax both the width of the wheelchair and its turning radius.

Many of the issues that relate to use in a domicile apply to use in public buildings. These issues tend to be amplified in public and wheelchair users can become sensitized. For example, they may become reluctant to dine at a favorite restaurant because their wheelchair is too high to fit under the dining table or because its turning radius carves such a large arc that the user is apt to strike the chairs of those sitting at nearby tables.

Similarly, the width of the chair can become an issue when entering bathrooms, passing down narrow corridors, and in other areas. While many businesses and public facilities have improved their handicapped accessibility, travel into unknown areas can present significant challenges to the person in a wheelchair. In general, whenever a user goes into an unfamiliar public place, at least some apprehension is apt to occur.

It is important to remember that spinal injury sufferers and those with other limiting infirmities have little or no physical capability. They may find themselves totally dependent on the maneuverability of the wheelchair, or lack thereof. They may not be able to manually push an object away from them or urge themselves in any way. This heavy reliance on the ability of the wheelchair also affects their willingness to venture out into the unfamiliar and unknown.

It is also more serious than that. A person who becomes wedged (i.e., jammed) in an opening leading into a bathroom, for example, (and whom is otherwise not ambulatory) is likely to experience fear, even panic. They can literally become stuck until someone arrives to help. They cannot eat, sleep, or sanitarily relieve themselves. If no one is coming for days, the situation can become critical, even when inside ones own home. While this type of scenario is not especially likely to occur when there is sufficient planning and support in place, it is well to keep in mind the seriousness of needs that such users can experience. This growing appreciation helps in understanding the quality of life issues that confront wheelchair users.

Clearly, quality of life is influenced by the wheelchair's ability to maneuver in tight interior areas.

It is also important to be able to use a wheelchair outside. It is not practical and for some it is impossible to vacate one wheelchair designed for inside use and enter into another wheelchair that is better designed for exterior use without also receiving assistance from another person. Often, that assistance is simply not available.

However, when wheelchairs that are designed for interior use are used outside, they can become unstable or get stuck. This is a very serious problem and can even be potentially life-threatening.

With self-propelled wheelchairs they tend to either be rear-wheel drive, front-wheel drive, or mid-wheel drive. With rear-wheel drive units, the drive (i.e., motor driven) wheels are in the rear of wheelchair and a pair of castors in the front of the wheelchair articulate to accommodate turns. With front-wheel drive wheelchairs, the opposite is true. With mid-wheel drive wheelchairs, the drive wheels are located somewhat more central to the wheelchair, with articulating castors in the front and/or rear.

When these types of wheelchairs are used outside, they may be used on concrete, tarmac, tar macadam, gravel, dirt, even soft or slightly muddy soil, such as in nature trails. They are used on level grade, going downhill, and uphill as well.

When used on hard exterior surfaces, traction and stability on a level grade is generally good. However, when going down or uphill, there is a shift in the center of gravity. When used on gravel, dirt, or soil, traction becomes an issue, as is described in greater detail hereinafter.

For example, with a front-wheel drive type of wheelchair when going downhill there is shift in the center of gravity that places a greater proportion of the weight onto the front, or driven wheels. This tends to promote traction. However, it lessens the amount of weight that is disposed on the castors which can affect stability and control of the wheelchair.

When going uphill, the shift in CG (center of gravity), places a greater proportion of weight onto the rear castors, resulting in a loss of weight, and therefore traction, by the front drive wheels. This can easily cause the front drive wheels to spin. If they spin just momentarily, there is the likelihood that they will create a recess or groove in the gravel or soil, thereby utterly losing all motive force. The wheelchair becomes suddenly stuck in a moment's time.

To the paraplegic or quadriplegic, this is a terrifying experience. They can be stranded outside somewhere between their home and a mailbox, on a nature trail, or elsewhere without help or assistance for an indefinite or prolonged period of time. They are subject to sunstroke, dehydration, hypothermia, hyperthermia, as well as considerable psychological and physical distress.

Whenever there is a loss of traction by any of the four wheels (two driven, two castors), there is an accompanying loss of directional control that also occurs. The wheelchair can abruptly change direction without user control. It can veer off the path, down into the woods, possibly causing great physical harm or psychological distress to the user. It is not unlike what an automobile driver would experience if there were a sudden loss of directional control while driving. The experience is terrifying, only more so to the person who is wheelchair-bound because he or she is either greatly limited or unable to leave the scene of the accident and get help.

The same issues also arise with a rear-wheel drive or mid-wheel drive type of wheelchair. There is always the risk that a driven wheel or wheels can spin in loose soil or gravel and lose traction or that a change in the center of gravity can cause a weight shift that results in a loss of stability or directional control by creating an imbalance in the weighting of the wheels.

Sometimes, to increase stability and directional control, spring loaded castors are used either in the front or rear of the wheelchair. Typically, articulating castors are used in the front and non-articulating possibly spring-loaded anti-tip castors are used in the rear. Other variations are possible. However, if the castors include springs that are relatively soft, there is always the possibility that the wheelchair can tilt excessively. This is because the "soft" castors may not provide sufficient support to retain the center of gravity within desirable limits when traversing a steep-enough incline.

Needless to say, it would be terrifying for a user if the wheelchair they were on were to tilt to such an extent that it tipped over backwards while going uphill. Yet this is entirely possible if the center of gravity is displaced too far rearward when going uphill or too far forward when going downhill.

Conversely, if spring-loaded castors are used that include stiff springs (to limit the range of forward and/or backward movement by the wheelchair on grade), then the likelihood exists that the castors (front and rear) will bear a greater proportion of the total weight than is desired. If castors that are not spring-loaded are used, this likelihood is further increased. When the castors bear a greater proportion of the total weight, this, in turn, removes weight from the drive wheels and greatly increases the chance that they will lose traction, spin, and in a moment's time cause the wheelchair to become stuck.

Also, as mentioned before, whenever there is a loss of traction especially for the drive wheels, there is also a loss of directional control. Remembering that steering is accomplished by the differential rotation of the drive wheels, a loss of traction by either or both of the drive wheels makes steering impossible to control.

To overcome these serious issues, certain manufacturers of wheelchairs have provided four-wheel drive types of wheelchairs that include four driven wheels, two in the front on an axle and two in the rear on an axle.

While this is of benefit outside, it clearly becomes a significant impediment if the wheelchair is used inside, and especially if it used on carpet or on throw rugs.

The reason for this can be understood by considering what happens to a four-wheel drive motor vehicle where a non-slip drive train is employed. The system works well on snow and ice and other slippery surfaces when going straight or when turning. However, when such a four-wheel drive vehicle is turned on hard, dry surfaces, a binding occurs between the wheels. This is because the front and rear wheels each track on a different radius and therefore each wheel travels a different amount. This causes the application of a greater drive force to certain wheels and a lesser drive force to be applied to other wheels.

If a four-wheel drive wheelchair is used inside on a hard surface the same binding will occur when turning. This will make turning of the wheelchair difficult, at best, and it can even prevent the wheelchair from turning. Clearly, this is undesirable.

If the four-wheel drive type of a wheelchair is used inside on a carpeted surface the same binding will also occur when turning. However, it is likely that one or more of the wheels will spin on the carpet, as needed to equalize the forces that are applied to the four driven (i.e., drive) wheels. The spinning can damage the carpet, either by leaving markings or by eroding and pulling carpet fibers out of their jute backing.

If the four-wheel drive type of a wheelchair is used on a throw rug another problem due to binding is likely to arise. When a prior-art type of four-wheel drive wheelchair is used on a throw rug, certain of the drive wheels can spin relative to other of the drive wheels, the same as they are apt to do on carpet.

However, the throw rug is not anchored to the floor as is the carpet. Therefore, the throw rug can wrap around a spinning drive wheel and become entangled. The user is apt to find that the wheelchair suddenly becomes entangled when traversing over a throw rug. This can also cause the wheelchair to become stuck. It may not be possible for the user to reverse motion or to otherwise free the wheelchair from the throw rug that has become tightly bound and wrapped around one or more of the drive wheels while being pinched down, perhaps, by other of the drive wheels.

Other problems in traction and stability (i.e., steering) can also occur. With a mid-wheel drive type of a wheelchair that includes both a front and a rear set of castors, when driven over a swale or when passing over a pothole, one or both of the drive wheels can become airborne with an instantaneous loss of traction, stability, and steering.

Again, if the springs that support any of the pairs (i.e., sets) of castors are too weak, the CG can shift excessively and the wheelchair can tip over, either forward or backward. If the springs are made sufficiently strong to prevent this from happening (or if the springs are eliminated), then at any moment the castors can support the entire weight of the wheelchair (and occupant) and the drive wheels can become airborne.

Also, when both front and rear castors are employed, the sweep of the wheelchair is greatly increased. The sweep is defined herein as the arc that the portion of the wheelchair that is furthest away from the axis of turning (usually midway between the drive wheels) takes. If a mid-wheel drive type of wheelchair is turning about a center point near the center of the wheelchair that is between the two drive wheels, the front castors (usually standard equipment on these types of wheelchairs) will sweep an arc. If the arc transcribed by the front castors were to strike an object, for example a leg of a dining table, the turn could not be completed.

When a pair of optional rear castors is also included in a mid-wheel drive type of wheelchair, they now introduce a rear arc that increases the total amount of sweep, or turning radius that is required.

The rear castors are needed for outside stability, especially when going uphill, but inside they hinder turning and maneuverability in general.

It is important to note also that the mid-wheel drive type of wheelchair was made in response to a potential loss of traction that might occur with either front or rear-wheel drive types of wheelchairs that are used on incline. This configuration helped to keep a reasonable amount of the weight disposed over the mid-drive wheels providing the wheelchair did not tilt (i.e., tip) excessively. The tradeoff that occurred with mid-wheel types of wheelchairs was an increased tendency to tip, especially backward when going up grade.

To counter this tendency, a second set of rear castors (in addition to the standard front castors) was added. And, as mentioned above, this then introduced the problem of a loss of weight on the mid-drive wheels occurring during passage over swales and potholes that could place all or most of the weight on the front and rear castors.

Also, another problem with rear castors is that they are not visible to the user when turning. Accordingly, the user is more apt to strike objects with them. Front castors are regarded as far more desirable than rear castors for turning because the user can see the maximum sweep (i.e., arc) that the front castors will navigate while turning. If any impact with an object, such as a dining table leg, is imminent, the user would stop the turn and otherwise attempt to maneuver out of the area. With rear castors, their sweep is not visible and, accordingly, the user impacts objects. This can damage the objects impacted. It also jolts and frightens the user.

Accordingly, there exists today a need for a powered wheelchair that helps to ameliorate the above-mentioned problems and difficulties.

Clearly, such an apparatus would be especially useful and desirable.

It is also to be understood that many types of wheelchairs, not mentioned herein, are available with many other options and features. For example, a desirable feature that is available on certain brands and on certain models of wheelchairs includes a mechanism for raising the seat and helping therefore, to raise the person from a seating position into a more standing position.

This is useful (on level, stable surfaces) when people are gathered together in, generally, a standing situation, such as during parties and other social gatherings. It provides the person in the wheelchair the opportunity to converse with others at face level. This helps to lessen the differences and barriers to conversation that arise between the ambulatory person and the person in the wheelchair.

However, when a wheelchair includes the option of elevating the person into a standing position, it also urges the person forward. This, in turn, moves the CG forward, placing more of the weight on the front castors. Generally, the types of wheelchairs that are able to provide this capability do not include front wheel drive. They are primarily mid-wheel drive units.

This forward movement of the CG when raising the person into a standing position requires that the front castors be substantially rigid. If they were spring loaded, especially if the springs were soft, then there would be a pronounced tendency to tilt the chair forward as the CG is displaced forward. This could then expel the standing person from the chair. Clearly, this is undesirable.

Accordingly, if the standing capability is desired, then a very stiff or rigid front pair of castors are required to maintain the wheelchair in the same plane whether the person is seated (while on a level grade), during raising of the person, and after the person has been elevated forward and into a standing position. Similarly, when the person is lowered, the same plane that the wheelchair is disposed on must also be maintained.

2. Description of Prior Art

Wheelchairs are, in general, known. While the structural arrangements of the known types of devices may, at first appearance, have certain similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a powered wheelchair that is useful inside a residence.

It is also an important object of the invention to provide a powered wheelchair that is useful outside.

Another object of the invention is to provide a powered wheelchair that includes four-wheel drive.

Still another object of the invention is to provide a powered wheelchair that includes full-time four-wheel drive.

Still yet another object of the invention is to provide a powered wheelchair that includes a first pair of driven wheels and an additional pair of driven wheels which, together, provide four-wheel drive capability and wherein the additional pair of driven wheels is disposed above the first pair of driven wheels when the wheelchair is disposed on a level surface.

Yet another important object of the invention is to provide a powered wheelchair that includes a pair of driven wheels and an additional pair of driven wheels which, together, provide four-wheel drive capability and wherein the additional pair of driven wheels is disposed above the pair of driven wheels when the wheelchair is disposed on a level surface and wherein the additional pair of driven wheels are adapted for contact with a surface when the wheelchair is disposed on a sufficient incline.

Still yet another important object of the invention is to provide a powered wheelchair that includes a pair of driven wheels and an additional pair of driven wheels which, together, provide four-wheel drive capability and wherein the pair of driven wheels includes a left driven wheel and a right driven wheel and wherein the additional pair of driven wheels includes a left additional driven wheel and a right additional driven wheel, and wherein the left additional driven wheel is linked to the left driven wheel whereby the left additional driven wheel always rotates in the same direction as the left driven wheel and the right additional driven wheel always rotates in the same direction as the right driven wheel.

A first continuing object of the invention is to provide a powered wheelchair that includes steering the wheelchair by controlling the differential rotary movement about an axis of each of a pair of driven wheels with respect to each other.

A second continuing object of the invention is to provide a powered wheelchair that includes a pair of driven wheels that are disposed on a first axis and whereby steering the wheelchair is controlled by varying a differential rotary movement about the first axis of each of the driven wheels with respect to each other and which also includes an additional pair of driven wheels which, together with the driven wheels, provide four wheel drive capability.

A third continuing object of the invention is to provide a powered wheelchair that includes a pair of driven wheels that are disposed on a first axis and which also includes an additional pair of driven wheels that are disposed on a second axis which, together with the driven wheels, provide four wheel drive capability, and wherein steering of the wheelchair is controlled by varying a differential rotary movement about the second axis of each of the additional pair of driven wheels with respect to each other.

A fourth continuing object of the invention is to provide a powered wheelchair that includes a pair of driven wheels that are disposed on a first axis and which also includes an additional pair of driven wheels that are disposed on a second axis which, together with the driven wheels, provide four wheel drive capability, and wherein steering of the wheelchair is controlled by varying a differential rotary movement about the first axis of each of the pair of driven wheels with respect to each other and by varying a differential rotary movement about the second axis of each of the additional pair of driven wheels with respect to each other.

A fifth continuing object of the invention is to provide a powered wheelchair that includes a front pair of castors and a pair of driven wheels that are disposed on a first axle and a pair of additional driven wheels that are disposed on a second axle, and wherein a bottom of the pair of castors and a bottom of the pair of driven wheels are each disposed on a first plane, and wherein the second axle is disposed behind the first axle, and wherein when the wheelchair is disposed on a level surface it is disposed in the first plane and wherein the bottom of the pair of castors and the bottom of the pair of driven wheels are disposed on the surface, and wherein when the wheelchair is disposed in the first plane a bottom of the additional driven wheels are disposed above the surface.

A sixth continuing object of the invention is to provide a powered wheelchair that includes a front pair of castors and a pair of driven wheels that are disposed on a first axle and a pair of additional driven wheels that are disposed on a second axle, and wherein a bottom of the pair of castors and a bottom of the pair of driven wheels are each disposed on a first plane, and wherein the second axle is disposed behind the first axle, and wherein when the wheelchair is disposed on a level surface it is disposed in the first plane and wherein the bottom of the pair of castors and the bottom of the pair of driven wheels are disposed on the surface, and wherein when the wheelchair is disposed in the first plane a bottom of the additional driven wheels are disposed above a surface, and wherein when the wheelchair is disposed facing up an incline of sufficient pitch, the wheelchair pivots so that the bottom of each of the front pair of castors are disposed off of the surface and the bottom of the additional pair of driven wheels are disposed on the surface along with the bottom of the driven wheels.

A seventh continuing object of the invention is to provide a powered wheelchair that is adapted for use with a mid-wheel drive type of wheelchair.

An eighth continuing object of the invention is to provide a powered wheelchair that includes four-wheel drive and wherein there is no binding of the four-wheel drive when the wheelchair is used indoors and on a hard surface that has good traction.

A ninth continuing object of the invention is to provide a powered wheelchair that includes four-wheel drive and wherein there is no spinning by any of the driven wheels sufficient to cause damage to a carpet when the wheelchair is being operated on the carpet.

A tenth continuing object of the invention is to provide a powered wheelchair that is less likely to cause a loss of steering when operated on an incline.

An eleventh continuing object of the invention is to provide a powered wheelchair that is less likely to cause a loss of control when operated on an incline.

A twelfth continuing object of the invention is to provide a powered wheelchair that is less likely to cause a loss of steering when operated on a surface that has a lower coefficient of friction (i.e., is more slippery).

A thirteenth continuing object of the invention is to provide a powered wheelchair that is less likely to cause a loss of control when operated on a surface that has a lower coefficient of friction (i.e., is more slippery).

A fourteenth continuing object of the invention is to provide a powered wheelchair that is less likely to tip over during use.

A fifteenth continuing object of the invention is to provide a powered wheelchair that is less likely to get stuck during use.

A sixteenth continuing object of the invention is to provide a powered wheelchair that is less likely to get stuck in gravel.

A seventeenth continuing object of the invention is to provide a powered wheelchair that is less likely to get stuck in soil.

An eighteenth continuing object of the invention is to provide a powered wheelchair that is safer when traveling down an incline.

A nineteenth continuing object of the invention is to provide a powered wheelchair that is safer when traveling up an incline.

A twentieth continuing object of the invention is to provide a powered wheelchair that is highly maneuverable when used indoors.

A twenty-first continuing object of the invention is to provide a powered wheelchair that is highly stable when used outdoors.

A twenty-second continuing object of the invention is to provide a powered wheelchair that is adapted for use with types of wheelchairs that can elevate a person sitting thereon into a standing position.

A twenty-third continuing object of the invention is to provide a powered wheelchair that can lessen fear or apprehension on the part of a user when the wheelchair is used on inclines.

A twenty-fourth continuing object of the invention is to provide a powered wheelchair that can lessen fear or apprehension on the part of a user when the wheelchair is used on slippery surfaces.

A twenty-fifth continuing object of the invention is to provide a powered wheelchair that can improve the quality of life for a person using the wheelchair.

Briefly, a powered wheelchair that is constructed in accordance with the principles of the present invention has a pair of driven wheels that are disposed generally under the chair. A pair of preferably front-disposed castors are also included and, together with the pair of driven wheels, define a first plane that the wheelchair is disposed on when the wheelchair is disposed on a level surface. A pair of additional driven wheels is provided that are elevated above the first plane. The additional driven wheels can be disposed either in front of or behind the two driven wheels. Together, the two driven wheels and the pair of additional driven wheels define a second plane. When the wheelchair is disposed on a sufficient incline, it tilts from the first plane into the second plane. At that time, contact with the surface is maintained by the driven wheels. The castors rise off of the surface and contact with the surface is made by the pair of additional driven wheels, whereby the pair of additional driven wheels provides an additional motive force in addition to the driven wheels to help propel the wheelchair.

Figure 4:
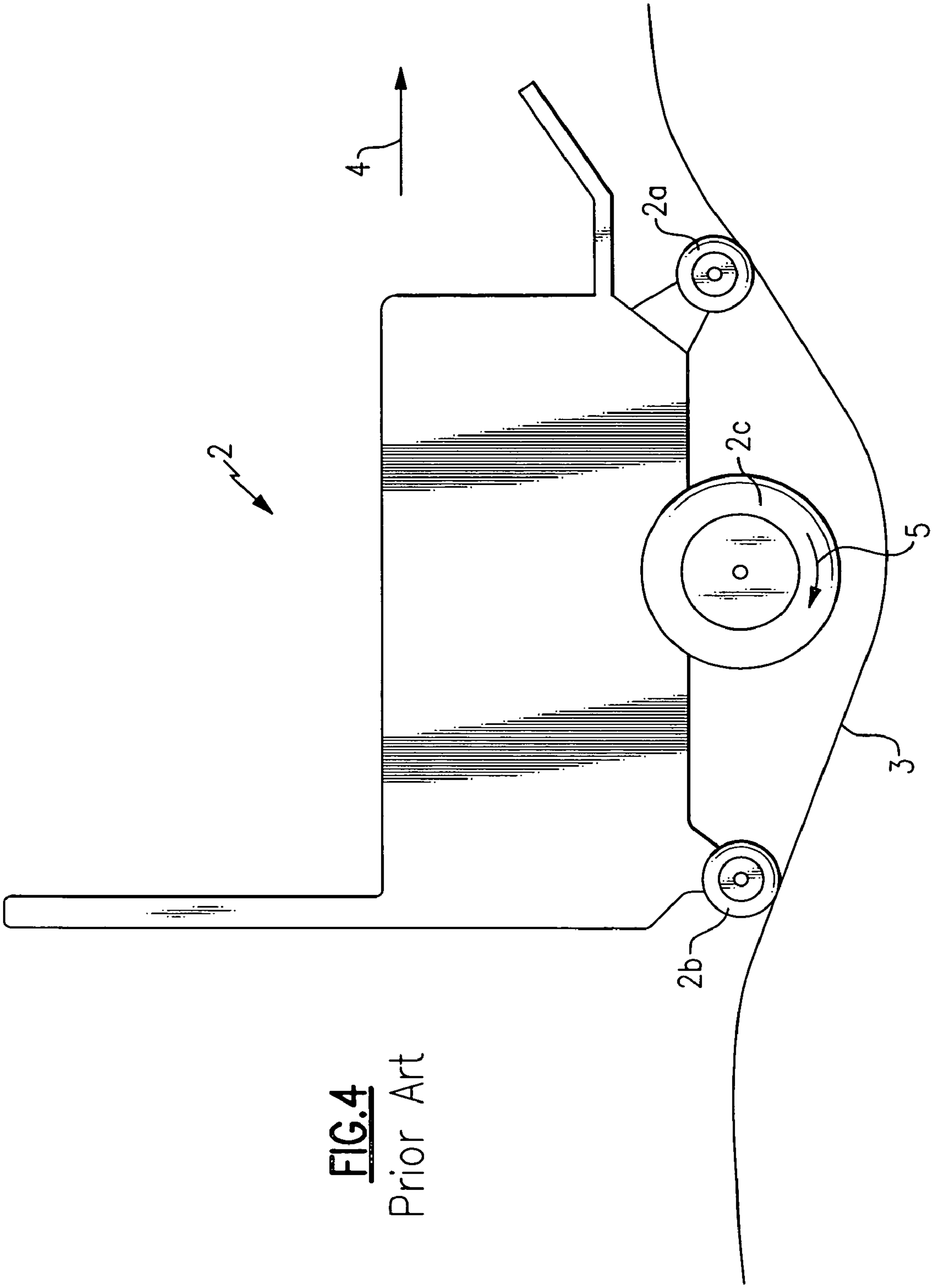
FIG.4 Prior Art

The FIG. 4 PRIOR ART illustrates what happens when a prior art type of a wheelchair passes over a swale.

DETAILED DESCRIPTION OF THE INVENTION

Referring initially to the PRIOR ART drawing is shown a side view of a prior art type of a wheelchair, identified in general by the reference numeral 2. The prior art wheelchair 2 is of the mid-wheel drive variety that includes a pair of front articulating castors 2*a* and a pair of rear castors 2*b*. A pair of drive wheels 2*c* is disposed between the front castors 2*a* and the rear castors 2*b*. Only those wheels 2*a*, 2*b*, 2*c* that are disposed on this side of the drawing are visible.

The prior art wheelchair 2 is being operated on a firm, hard surface. Normally, this type of a surface provides excellent traction. The surface includes a swale 3 (i.e. a recessed area) that the prior art wheelchair 2 has passed over.

As can be seen, the entire weight of the prior art wheelchair 2 and occupant (not shown) are now being carried entirely by the front and the rear castors 2*a*, 2*b*. The drive wheels 2*c* are disposed in the swale 3 and have become raised above the surface as the prior art wheelchair 2 moved sufficiently far in a forward direction, as shown by arrow 4. The front drive wheels 2*c* are now spinning, as shown by arrow 5. Forward motion of the prior art wheelchair 2 has ceased and it has suddenly become stuck in the swale 3.

To the occupant, this is a terrifying situation. It is not now possible to move the prior art wheelchair 2 either forward, in the direction of arrow 4 or in reverse, in a direction that is opposite that of arrow 4 under its own power. The occupant was moving forward on a good surface. The occupant passes over the swale 3 and, in an instant, becomes stuck without warning. The occupant is helpless and cannot get out of the swale 3 without additional assistance.

This prior art illustration is useful because it illustrates the problems that the occupant (i.e., user) can experience even when operating the prior art wheelchair 2 on a surface that normally provides excellent traction. The prior art wheelchair 2 user quickly discovers that he or she is virtually always at risk of suddenly becoming stuck.

Figure 1:
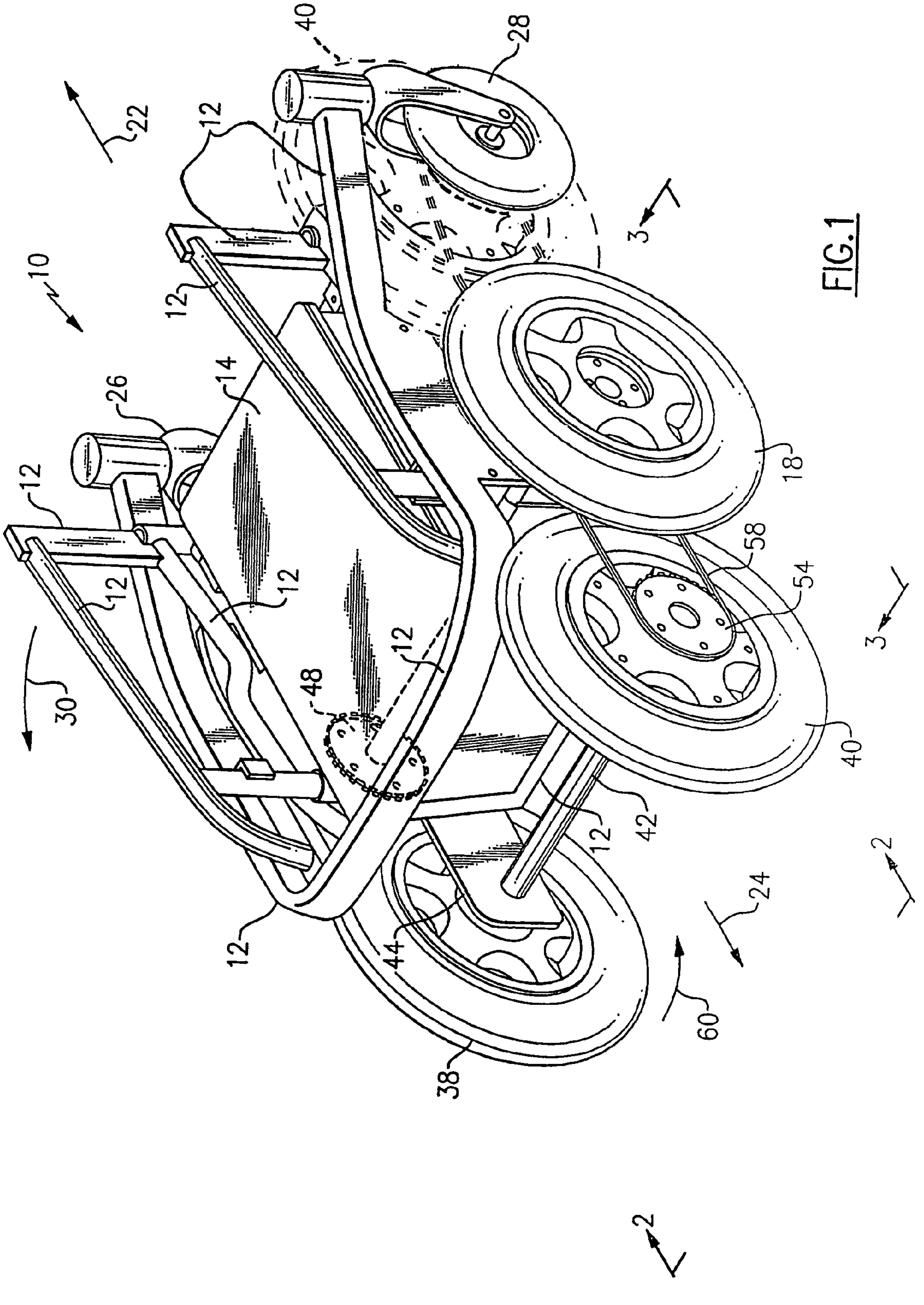
FIG. 1 is a view in perspective of only a lower portion of a powered wheelchair.
Figure 2:
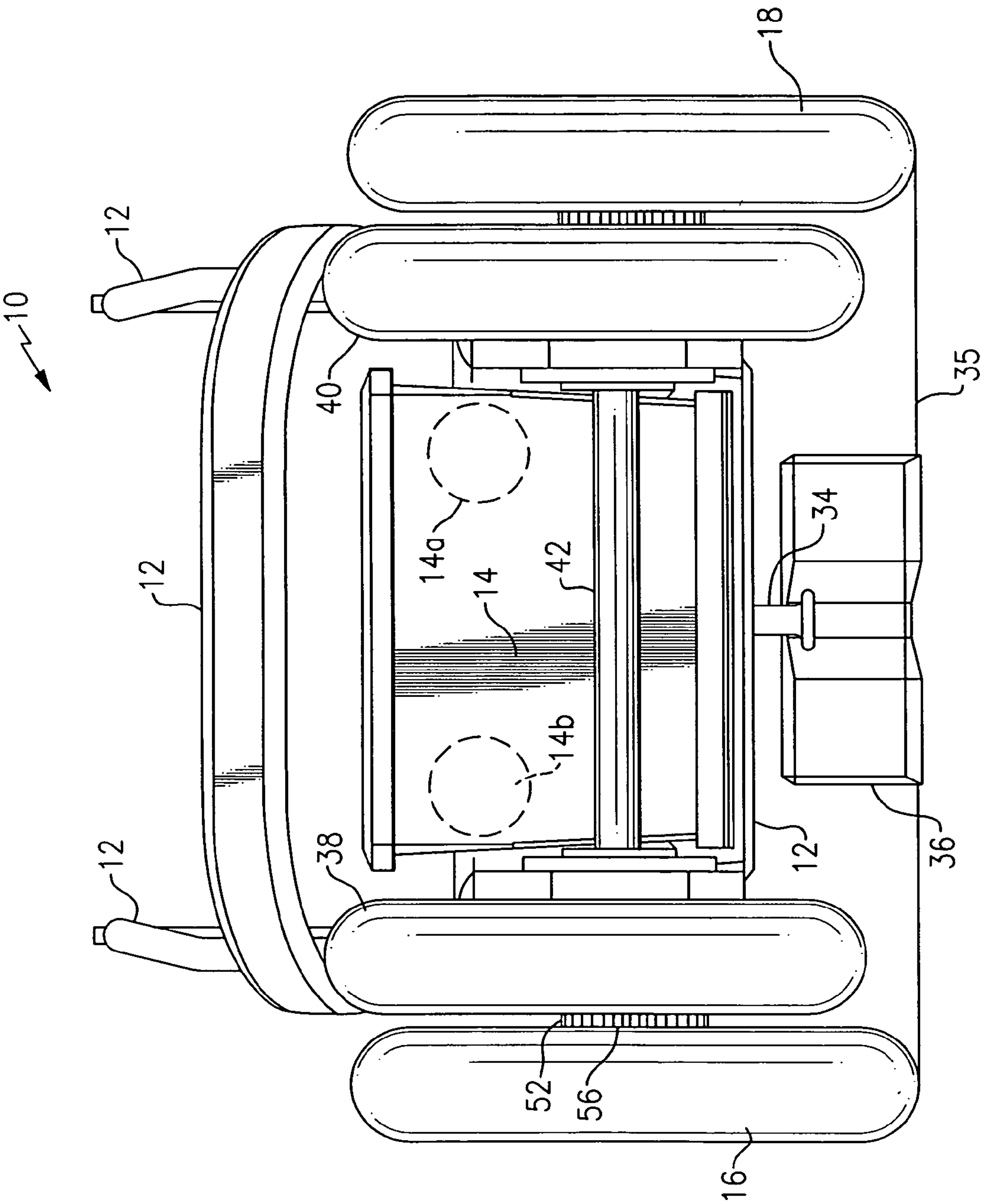
FIG. 2 is a rear elevational view of the powered wheelchair of FIG. 1 as seen along the lines 2-2 therein.
Figure 3:
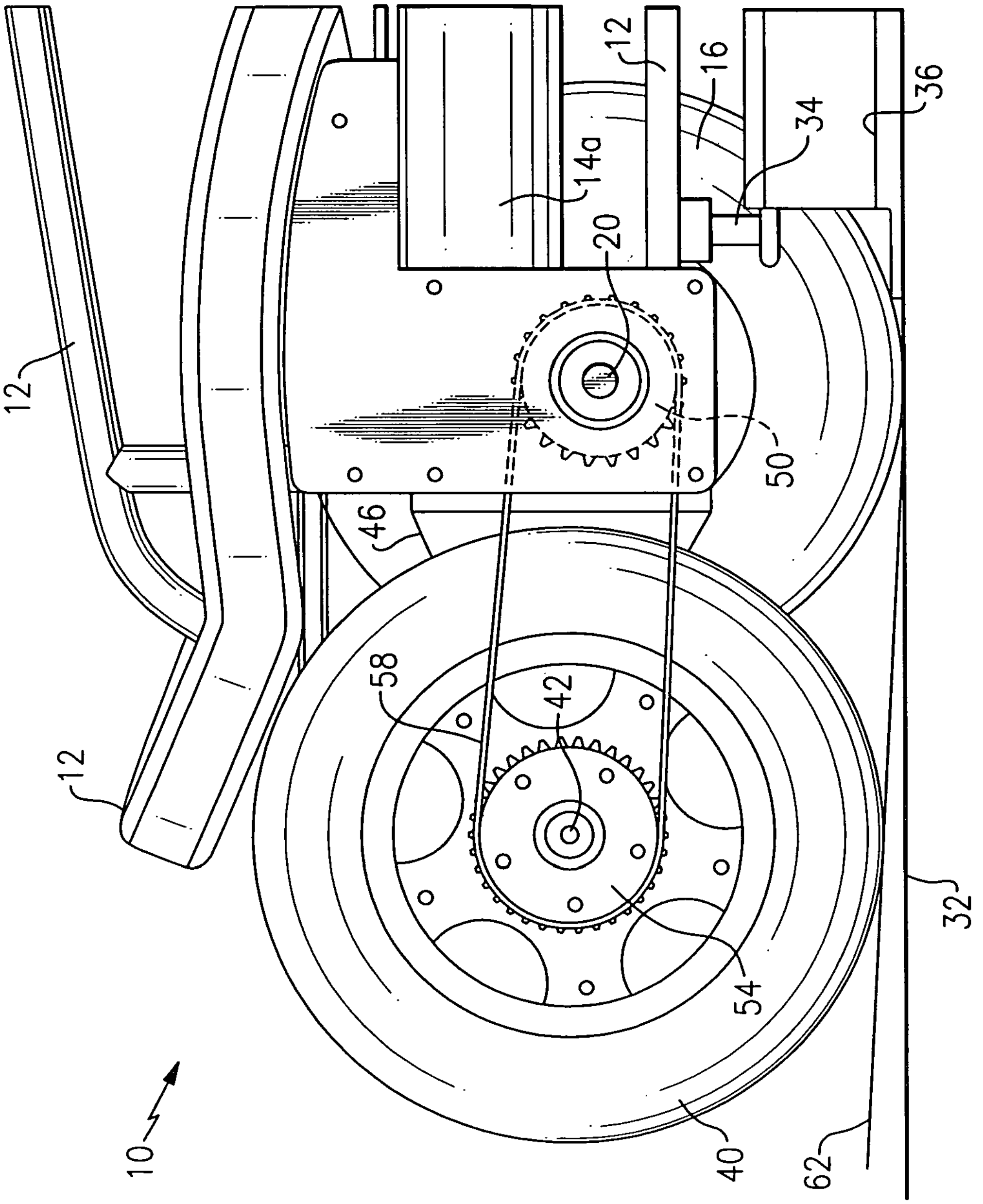
FIG. 3 is a side elevational view of the powered wheelchair of FIG. 1 as seen along the lines 3-3 therein and with a right driven wheel (only) removed from the view for clarity.

Referring now alternately to FIG. 1, FIG. 2, and FIG. 3 on occasion is shown, a lower portion of a powered wheelchair, identified in general by the reference numeral 10.

A portion of a supporting frame 12 structure is shown. A remainder of the frame 12 extends upward to support a seat (not shown) and other parts of the wheelchair 10.

A power unit 14 includes a pair of DC electric motors (only a first motor 14*a* is shown in FIG. 3, a second motor 14*b* is shown in dashed lines in FIG. 2), each of the pair of motors 14*b*, 14*a* driving one of a pair of driven wheels 16, 18 respectively.

Because the driven wheels 16, 18 are urged or driven by each of the first and second motors 14*a*, 14*b*, they are referred to herein as each being a type of "driven" wheel, as they are each "driven" by the motors 14*a*, 14*b*. It is important to note that the driven wheels 16, 18 supply the normal motive force, as is described in greater detail hereinafter, to propel the wheelchair 10 (depending on incline and type of terrain). Accordingly, the driven wheels 16, 18 may also be referred to as being "drive wheels" by some in the industry, because they help "drive" the wheelchair 10. For consistency, the term "driven wheels 16, 18" is used in the disclosure.

A rechargeable storage battery (not shown) is also disposed in the power unit 14.

As the battery and motors 14*a* 14*b* are heavy, it is preferable that they be disposed as low as possible to help create as low a center of gravity (CG) as possible. The lower and more centralized the CG; the more stable will be the wheelchair 10.

Preferably each of the pair of driven wheels 16, 18 are each disposed on opposite ends of a main axle 20 (see FIG. 3). The axle 20 supports the driven wheels 16, 18. However, the driven wheels are supported by bearings and are able to rotate independent of the axle 20, and therefore also independent with respect to each other. Accordingly, the axle 20 includes a center longitudinal axis that aligns with a center of the driven wheels 16, 18.

The pair of driven wheels 16, 18 includes a left driven wheel 16 and a right driven wheel 18, as shown. The wheelchair 10 is intended to be driven in a forward direction as shown by arrow 22 and in a reverse direction, as shown by arrow 24.

The first motor 14*a* is disposed on a right side of the power unit 14 closest to the right driven wheel 18 and is mechanically coupled to the right driven wheel 18. The first motor 14*a* is able to rotate the right driven wheel 18 either forward or backward independent of the rotation of the left driven wheel 16. The first motor 14*a* drives the right driven wheel 18 in either direction, and is used to propel the wheelchair 10 either forward in the direction of arrow 22 or reverse in the direction of arrow 24.

The second motor 14*b* is disposed on an opposite side of the power unit 14 and is mechanically coupled to the left driven wheel 16. The second motor 14*b* is able to rotate the left driven wheel 16 either forward or backward independent of the rotation of the right driven wheel 18. The second motor 14*b* drives the left driven wheel 16 in either direction, and is used to propel the wheelchair 10 either forward in the direction of arrow 22 or reverse in the direction of arrow 24.

If desired, the main axle 20 could, of course, be replaced with a pair of axles (not shown) that share the same center longitudinal axis.

A pair of articulating castors 26, 28 are each attached to the frame 12 and are disposed in the front of the wheelchair 10.

By energizing the first motor 14*a* so that it rotates the right driven wheel 18 in a forward direction and simultaneously energizing the second motor 14*b* so that it rotates the left driven wheel 16 in a reverse direction, the wheelchair 10 will turn in a counter-clockwise direction as it pivots about a center point that is disposed generally midway between the right and left driven wheels 18, 16.

Accordingly, the pair of castors 26, 28 will sweep in a first arc 30 toward the left. Because the pair of castors 26, 28 is disposed close to the driven wheels 16, 18, the size of the arc will be minimal. Accordingly, a small turning radius well-suited for use indoors is provided.

Similarly, by energizing the first motor 14*a* so that it rotates the right driven wheel 18 in a reverse direction and simultaneously energizing the second motor 14*b* so that it rotates the left driven wheel 16 in a forward direction, the wheelchair 10 will turn in a clockwise direction as it pivots about the center point and sweeps in a second arc that is opposite in direction as that of the first arc 30.

The input signal to control the motors 14*a*, 14*b* comes from an input supplied by movement of a joystick (not shown) or by any other preferred input sensor, as is well known in the powered wheelchair arts.

When the wheelchair 10 is disposed on a level, planar surface a bottom of each of the castors 26, 28 will bear upon the surface as will a bottom of each of the driven wheels 16, 18. The bottom of the castors 26, 28 and the bottom of the driven wheels 16, 18 define a first plane 32 (FIG. 3).

During typical use indoors, it can be assumed that the surfaces will be level and planar and that therefore, the wheelchair 10 will normally be disposed in the first plane 32.

Referring briefly to FIG. 2 is shown a pintle 34 (i.e., a pin) that is attached to the frame 12 at a bottom of the wheelchair and extending downward toward a surface 35. The pintle 34 is used as an anchoring mechanism to secure the wheelchair 10 in position, for example, in a motor vehicle (not shown).

The pintle 34 engages with a receiver block 36 by a preferred type of latch mechanism (not shown), the receiver block 36 being attached to the vehicle. To remove the wheelchair 10 from the vehicle, the latch mechanism is released and the wheelchair 10 is urged away from the receiver block 36.

The preceding portion of the "Detailed Description of the Invention" (i.e., the disclosure) thus far is indicative of a state that is representative of the known prior art. It has been included so as to provide a general foundation of the prior art and it will be relied upon during a detailed description of the instant improvements, as follows hereinafter.

It is appropriate to consider the difficulties and problems in general of wheelchair usage that are described in the "Background of the Invention" section of the instant disclosure with that portion of the wheelchair 10 that has been described up to this point (while, of course, excluding the "Objects and Summary of the Invention" portion of the instant disclosure from the prior art). This is because the prior art (i.e., that portion of the wheelchair 10 as described in the "Detailed Description of the Invention" up to this point) is prone to suffer from the problems and difficulties as are discussed in the "Background of the Invention" section of the disclosure.

Therefore, a basis or foundation regarding the state of development of the prior art is necessary so that a complete understanding of the improvements and benefits thereof that are to be described in detail hereinafter can occur.

The wheelchair 10, as described thus far, includes two-wheel drive capability from the driven wheels 16, 18 and steering that is the result of the differential movement of the driven wheels 16, 18. It is important to note that the driven wheels 16, 18 are disposed substantially under the wheelchair 10 as opposed to being well in back or well in front of the wheelchair 10.

As such, the wheelchair 10, as described thus far, is of the mid-wheel drive variety. If it, without further addition, were to be used climbing up a steep incline it would have a tendency to tip over backwards. Accordingly, were it not for the improvements that are to be described hereinafter, the only known prior art way to help prevent the wheelchair 10 from tipping over backwards would be to add a pair of rear stabilizing castors (not shown).

However, as has been described hereinabove, if the rear stabilizing castors were to include springs that are too soft, the danger of tipping over backwards would remain.

Conversely, if the rear stabilizing castors were to include springs that are sufficiently strong enough to substantially lessen the likelihood that the wheelchair would tip over backwards when climbing up a steep incline, then the likelihood arises that the "stiff" rear stabilizing castors in combination with the pair of articulating (i.e., front) castors 26, 28 will periodically (i.e., when going over dips, potholes, etc.) bear all of the weight and, therefore, allow the driven wheels 16, 18 to become suspended in the air.

This would not only cause the wheelchair 10 to become stuck (because the motive force would be removed), but it would also take away steering capability (i.e., directional control and stability).

Continuing with the disclosure, a left additional driven wheel 38 and a right additional driven wheel 40 are included.

They each rotate independently about a rear axle 42. Accordingly, the left additional driven wheel 38 and the right additional driven wheel 40 are able to rotate at different speeds with respect to each other and in opposite directions at the same time, as desired.

A left bracket 44 is attached to the frame 12 proximate the power unit 14 on a left side of the wheelchair 10. A right bracket 46 is attached to the frame 12 proximate the power unit 14 on a right side of the wheelchair 10. The left and right brackets 44, 46 extend rearward away from the power unit 14.

The rear axle 42 passes through the left and right brackets 44, 46. Together, the left bracket 44 and the right bracket 46 provide a stable support for the rear axle 42 and, in turn, for the left and right additional driven wheels 38, 40.

A first drive sprocket (48, dashed line, FIG. 1) is attached to the left driven wheel 16 at an inside thereof. A second drive sprocket 50 is attached to the right driven wheel 18 (FIG. 3) at an inside thereof.

A first driven sprocket 52 is attached to an outside of the left additional driven wheel 38. A second driven sprocket 54 is attached to an outside of the right additional driven wheel 40.

The first drive sprocket 48 is on the same plane as is the first driven sprocket 52. The second drive sprocket 50 is on the same plane as the second driven sprocket 54.

A first drive chain 56 passes around the first drive sprocket 48 and around the first driven sprocket 52 and extends there-between. A second drive chain 58 passes around the second drive sprocket 50 and around the second driven sprocket 54 and extends there-between.

Accordingly, as the left driven wheel 16 (including the outer tire portion thereof) rotates, the left additional driven wheel 38 also rotates, matching both the direction of rotation and the rate of rotation as that of the left driven wheel 16. This, of course, assumes that the first drive sprocket 48 and the first driven sprocket 52 have the same number of teeth (i.e., a 1:1 drive-ratio) and also that the outer circumference of the left driven wheel 16 is the same as that of the left additional driven wheel 38.

Similarly, and with the same basic assumptions applied thereto, as the right driven wheel 18 rotates, the right additional driven wheel 40 also rotates, again matching both the direction of rotation and the rate of rotation as that of the right driven wheel 18.

This provides a new configuration with unexpected benefits. A four-wheel drive capability is provided for the wheelchair 10 along with a redundant method of differential steering. Not only is traction improved, but stability and steering (control) are also improved.

If, for example, either or both of the driven wheels 16, 18 were to become elevated above the surface 35 or otherwise lose traction, differential steering capability would still be maintained by the additional driven wheels 38, 40.

Accordingly, traction would be maintained sufficient for the wheelchair to continue motion and the user would continue to be able to steer the wheelchair 10, even during those periods when the "original" driven wheels 16, 18 are elevated above the surface 35. This provides a substantial benefit.

It is also easy and inexpensive to modify the original wheelchair 10 to accommodate the improvements herein disclosed. The left and right brackets 44, 46 are easy to manufacture and to attach, where and how desired, to the frame 12. The brackets 44, 46 can be attached by drilling into the frame 12, tapping the holes drilled, and by the use of bolts (not shown) to secure the brackets 44, 46 to the frame 12. Alternately, the brackets 44, 46 can be welded to the frame 12. Or, if preferred, the frame 12 can be modified to include the brackets 44, 46 as an integral part, thereof.

Similarly, the rear axle 42 is easy to attach to the brackets 44, 46 as are the sprockets 48-54 easy to attach to their respective wheels 16, 18, 38, 40. It is also preferable to construct the additional driven wheels 38, 40 using the same type and size material as is used with the driven wheel 16, 18.

This is because the driven wheels 16, 18 include as large as possible a size for their wheels (16, 18) and this large size enhances floatation on loose or soft soil. This, in turn, makes the wheelchair more versatile. It can also pass over gravel better than it could if the driven wheels 16, 18 were smaller in size. Similarly, by keeping the additional driven wheels 38, 40 the same size and type as that of the driven wheels 16, 18, traction and versatility are optimized.

It is important to note also that a wheel-track of the additional driven wheels 38, 40 does not align with that of the driven wheels 16, 18. Instead, the wheel-track of the additional driven wheels 38, 40 is preferably narrower, as shown. This places them slightly inside with respect to each of the driven wheels 16, 18. This allows placement, also as shown, of the additional driven wheels 38, 40 closer toward the driven wheels 16, 18 than would otherwise be possible. A forward edge of each of the additional driven wheels 38, 40 is disposed in front of a rear edge of each of the driven wheels 16, 18. This provides unexpected benefits. By moving the additional driven wheels 38, 40 closer toward a geometric center of the wheelchair 10, a second arc, as shown by arrow 60 is provided that is closer to the wheelchair 10 than would be possible if the additional driven wheels 38, 40 were disposed further away.

Accordingly, less area for maneuvering the wheelchair 10 is required. This makes the wheelchair 10 especially well-suite for use indoors, in public places, and in general wherever maneuverability is of concern.

Certain other benefits of having the additional driven wheels 38, 40 disposed nearer to the driven wheels 16, 18 are described in greater detail, hereinafter.

Remembering that when the wheelchair 10 is disposed on a level surface it is also disposed in the first plane 32 (FIG. 3). The first plane 32 and the surface 35 (FIG. 2) are equal when the wheelchair 10 is used on a flat and level grade.

Referring to all of the drawing figures and especially now to FIG. 2 and FIG. 3, it is noted that the additional driven wheels 38, 40 are disposed above (i.e., elevated with respect to) the driven wheels 16, 18. Ideally, a bottom of the additional driven wheels 38, 40 are disposed about a centimeter (about one-half of an inch) above the surface 35 when the wheelchair 10 is disposed in the first plane 32.

Accordingly, when the wheelchair 10 is in the first plane 32 only the driven wheels 16, 18 and the pair of articulating castors 26, 28 are in contact with the surface 35. Accordingly, a bottom of each of the driven wheels 16, 18 and a bottom of each of the pair of articulating castors 26, 28 define the first plane 32. When the wheelchair 10 is on level grade, with or without an occupant therein, the center of gravity (CG) will ensure that it is disposed (normally) on the first plane 32.

This provides several significant benefits over the known prior art. When the wheelchair 10 is disposed in the first plane 32, there is no contact by the additional driven wheels 38, 40 with the surface 35. The additional driven wheels 38, 40 merely spin above the surface 35. It is important to note that the additional driven wheels 38, 40 will always be rotating (i.e., spinning) in accordance with the rotation that each of the driven wheels 16, 18 is experiencing, respectively.

As the additional driven wheels 38, 40 spin above the surface 35 (i.e., when the wheelchair 10 is moving along the first plane 32), they do no damage to the surface 35. Remembering also that in any four-wheel drive system differential binding (between the wheels 38, 40, 16, 18) can occur during turning. If the surface 35 were to include carpeting, there is no spinning by any of the additional driven wheels 38, 40 (or by the driven wheels 16, 18) that can occur and possibly stain, burn, or otherwise damage the carpet. The same applies when the wheelchair 10 is used on any hardwood or other smooth type of flooring.

Similarly, there is no binding that can occur. Power is conserved which results in longer battery life and therefore, greater range for the wheelchair 10 between charges. Efficiency remains very high as the normally "free-spinning" additional driven wheels 38, 40 consume almost no energy whatsoever.

The instant invention allows for the use of full-time four wheel drive absent the normal problems of full-time four wheel drive. Accordingly, the instant wheelchair 10 can be used indoors and on level grade with virtually no compromise over a two-wheel drive type of wheelchair (not shown). This is a substantial improvement over all of the prior art types of wheelchairs 2 and other types, not shown.

The normally free-spinning additional driven wheels 38, 40 provide a significant benefit whenever the wheelchair 10 is urged up a significant-enough incline.

Referring now to FIG. 3 is shown a second plane 62. The second plane 62 extends from the bottom of the driven wheels 16, 18 to the bottom of the additional driven wheels 38, 40. As can be seen, the second plane 62 is different than the first plane 32.

When the wheelchair 10 is urged up a steep-enough incline the CG of the wheelchair and occupant (and any cargo that might also be carried) will shift rearward. With prior art types of the wheelchair (not shown), the danger is of tipping over backwards.

If the incline is sufficiently steep, the wheelchair 10 will rock backwards from the first plane 32 into the second plane 62. As it rocks backward, the pair of articulated castors 26, 28 will rise above the surface 35 (which is now inclined).

Once the bottom portion of the additional driven wheels 38, 40 contacts the surface 35, the rearward rocking motion ceases. At that time, the wheelchair will be disposed in the second plane 62.

When the wheelchair 10 is in the second plane 62, the additional driven wheels 38, 40 are also supplying additional motive force to help urge the wheelchair 10 up the incline. It is important to note that the four-wheel drive actually engages with the surface 35 and supplies the additional motive force only when that force is most likely to be needed, that is when going uphill.

Once the wheelchair 10 has traveled up the incline and begins to level off onto a level grade, the CG shifts forward and the wheelchair 10 gently rocks forward from the second plane 62 back into the first plane 32.

Accordingly, the wheelchair 10 can be used to climb considerably steeper inclines than would otherwise have been possible. This promotes confidence in the user who is far more likely to venture out than he or she would otherwise be inclined to do. Accordingly, that person's quality of life is substantially improved by the instant wheelchair 10.

It is now possible to understand why it is not preferable to dispose the rear axle 42 and the additional driven wheels 38, 40 too close to the driven wheels 16, 18. Remembering that the additional driven wheels need to be disposed about a centimeter above the first plane 32 (they can be less than a centimeter above the first plane 32 but to lower them too much is likely to damage a carpet).

If the rear axle 42 were too far forward, then the angle between the first plane 32 and the second plane 62 would increase. Accordingly, the user would experience a more substantial tilting rearward when going from the first plane 32 into the second plane 62. This could frighten the user who might think that he or she was about to tip over backwards when going up a steep incline.

Conversely, it is not desirable to dispose the rear axle excessively far to the rear or else the sweep of the second arc 60 will increase and cause a resulting loss of maneuverability of the wheelchair 10.

It is important to note also, that if the wheelchair 10 were to be used on especially soft soil while in the first plane 32, that it is possible that either or both of the driven wheels 16, 18 could slip and suddenly spin. As anyone driving a motor vehicle in soft soil well-understands, as soon as this happens, the drive wheels (in this case the driven wheels 16, 18) will each create a trench or a groove that they will quickly settle into.

This would instantly cause a prior-art type of wheelchair to become stuck. The potential terror and severity of this possibility has been discussed hereinbefore.

However, should this occur with the instant wheelchair 10, as soon as the driven wheels 16, 18 begin to spin and settle further down into the surface 35, the additional driven wheels 38, 40 will begin to make contact with the surface 35 as well and, therefore, they will supply an additional motive force.

The additional driven wheels 38, 40 will make contact to the rear, where presumably the soil is still hard. It is important also to note that the additional driven wheels 38, 40 will also make contact with the surface 35 on a different track (i.e., wheel-track) than that of the driven wheels 16, 18. This is because a preferred position for the additional driven wheels 38, 40 is that they be disposed on a narrower wheel-track that disposes them both inside of the driven wheels 16, 18.

Accordingly, when the additional driven wheels 38, 40 make contact with the surface 35 they will not fall into the recessed wheel grooves that have been formed by the spinning driven wheels 16, 18 as they continue to urge the wheelchair 10 forward. This, too, helps make the instant wheelchair 10 far less likely to get stuck than would any prior art type of four-wheel drive wheelchair that had each pair of its drive wheels disposed on the same wheel-track and, therefore, directly behind a more forward pair of drive wheels 16, 18.

The instant invention provides full-time four wheel drive capability for the wheelchair 10 that is used (i.e., engaged with the surface 35) only when needed. This provides significant, new, and unexpected benefits as described herein.

Accordingly, the instant wheelchair 10 is well adapted for use either indoors or outside. It provides excellent traction for use on gravel, soft or muddy soil, or on other slippery surfaces. It provides redundant differential steering capability. As such, it encourages the user to explore, to venture confidently whether inside or outside. By excelling both indoors and out-of-doors it provides one chair that is superb for use in both (i.e., multiple) environments.

Accordingly, the user does not need to change from one wheelchair into another wheelchair when going from the inside to the outside or when coming inside from the outside. The user is able to remain in the one instant wheelchair 10 that is well suited for use either inside or outside. The same is true if the user decides to leave a paved or concrete walkway while outside and venture down a wooded trail. The user does not need to switch wheelchairs and can, instead, remain in the wheelchair 10 and confidently go where he or she wills.

The range of mobility is greatly increased. Fear is decreased, and a substantial and corresponding increase in the quality of life of the user is realized. To the spinal injury user, for example, this can greatly help him or her to better enjoy their lives.

Of course, after having had benefit of the instant disclosure other changes are also possible. For example, if desired it is possible to place the additional driven wheels 38, 40 in front of the two driven wheels 16, 18 (instead of behind as is generally preferred) and to place the pair of articulating castors 26, 28 in the back of the wheelchair. Only one of the additional driven wheels (40) that is disposed forward of the driven wheels 16, 18 is shown. (See FIG. 1 dashed lines.)

This type of a modification would basically reverse the design layout and for certain applications may be preferred. However, instead of rocking from the first plane 32 into the second plane 62 when ascending a grade, that would occur when descending.

Similarly, if desired, the additional driven wheels 38, 40 could be modified in several possible ways, either alone or in combination. For example, the wheel-track (i.e., the space between them) of the additional driven wheels 38, 40 could be moved further inward or outward. If desired, the wheel-track of the additional driven wheels 38, 40 could be moved so as to align with the wheel-track of the driven wheels 16, 18. There may be situations where this is preferred.

If desired, the size of the additional driven wheels 38, 40 could be varied. The additional driven wheels 38 could include an outside diameter that is either greater or less than that of the driven wheels 16, 18.

It is well-preferred that regardless of the size of the additional driven wheels 38, 40, that they have a velocity at a circumference thereof that is the same as that of the driven wheels 16, 18. This ensures that when the additional driven wheels 38, 40 are in contact with the surface 35 that they and the driven wheels 16, 18 will attempt to urge the wheelchair 10 either forward or backward at the same rate of speed.

To accomplish this when the additional driven wheels 38, 40 include an outside diameter that is different than that of the driven wheels 16, 18, it is accomplished by correspondingly varying the drive ratio between the driven wheels 16, 18 and the additional driven wheel 28, 40.

Using the preferred drive train as shown herein, the number of teeth in either of the drive sprockets 48, 50 or in the driven sprockets 52, 54, or both, are varied accordingly to provide a drive ratio that result in an identical circumferential speed of the driven wheels 16, 18 and of the additional driven wheels 38, 40. If another drive mechanism (other than the chain drive 56, 58) is employed, a corresponding change in the drive ratio would be accomplished, for example, by varying a gear ratio (not shown) if a gear-drive mechanism were instead to be used to couple the additional driven wheels 38, 40 to the driven wheels 16, 18.

The preferred embodiment, as herein disclosed, includes the additional driven wheels 38, 40 added to a generally mid-wheel drive type of the wheelchair 10. It is to be understood that after having had benefit of the instant disclosure the additional driven wheels 38, 40 can also be added to a front-wheel drive or a rear-wheel drive type of wheelchair (not shown).

The instant disclosure has shown that by elevating the additional driven wheels 38, 40 above the first plane 32, a safer and more versatile type of the wheelchair 10 is obtained that provides many substantial and unexpected benefits over the prior art.

Again, after having had benefit of the instant disclosure, it is possible to further modify the additional driven wheels 38, 40 of the wheelchair 10, as desired, to include a plurality of possible elevations that they can be disposed at with respect to the surface 35.

For example, a four-bar (or other type of) mechanical linkage (not shown) can be included and attached to the frame 12 at one end thereof, where desired, and to the rear axle 42 at an opposite end thereof. A control lever (not shown) can be used to actuate the linkage sufficient to vary the elevation of the rear axle 42 with respect to the surface 35. A plurality of detents (not shown) may be used to secure the control lever (and therefore, the rear axle 42) at the desired elevation.

The simplest modification of this type would include two positions in which to secure the linkage (i.e., the lever). Of course, a power-actuated mechanism could be used to replace the control lever. A first elevated position would place the axle 42, and therefore the additional driven wheels 38, 40, at the same position (i.e., along the second plane 62) about one-half of an inch (or at any desired or preferred elevation) above the surface 35.

In the first elevated position, the additional driven wheels 38, 40 would function as described hereinbefore sufficient to provide all of the advantages thereof.

A second lowered position would place the axle 42 and therefore the additional driven wheels 38, 40 at the surface 35, and therefore, directly on the first plane 32. The second lowered position would cause both of the additional driven wheels 38, 40 to be continually in contact with the surface 35 (excluding, of course, swales, dips, potholes, etc), the same as the driven wheels 16, 18.

The second lowered position would provide optimum four-wheel drive motive force when the wheelchair 10 is used outdoors and on surfaces that have less than ideal traction. When binding on a hard surface, damaging carpet, entanglement with throw-rugs, or marring hardwood flooring are not at issue, the second lowered position is available for use. The user would simply grasp the control lever, free it from the current detent position, urge the lever into the second lowered position, and secure it in a detent that is provided at that position.

When the user entered a building or when this maximum amount of motive force was no longer required, the user would simply once again grasp the control lever, free it from the current detent position, urge the lever into the first elevated position, and secure it in an additional detent that is provided at that position. The carpet and floors would not be marred and optimum indoor maneuverability would, once again, be attained.

If the power-actuated mechanism is used in lieu of the control lever, whatever type of switch input is provided to control the power-actuated mechanism would be activated to urge the rear axle 42 into the desired position, where it would be maintained until the power-actuated mechanism is once again activated.

If additional intermediate positions were desired, additional detent positions between those of the first elevated position and the second lowered position would, correspondingly, be added.

An additional benefit resulting from an intermediate position for the additional driven wheels 38, 40 is that the degree of rocking motion that is experienced when going up an incline is lessened if the additional driven wheels 38, 40 are disposed somewhat closer to the surface 35.

Referring again momentarily to the PRIOR ART drawing, if instant wheelchair 10 were used instead of the prior art wheelchair 2, then the instant wheelchair 10 would not become stuck in the swale 3 when operated under identical conditions.

If the wheelchair 10 is used instead of the prior art wheelchair 2, then the drive wheels 2*c* would be replaced by the driven wheels 16, 18 and the pair of rear castors 2*b* would be replaced by the additional driven wheels 38, 40. The driven wheels 16, 18 are similar or identical to the drive wheels 2*c* of the prior art type of wheelchair 2.

As the instant wheelchair 10 enters into the swale 3, the loading will proportionately decrease on the driven wheels 16, 18 and it will proportionately automatically increase on the additional driven wheels 38, 40 as they continue to bear more of the weight of the wheelchair 10 and user (i.e., occupant). By the time the driven wheels 16, 18 are suspended (i.e., airborne) the additional driven wheels 38, 40 will have become fully engaged with the surface.

Accordingly, the instant wheelchair 10 will not become stuck. It will continue motion in the direction as shown by arrow 4.

Perhaps even more significant than that, the user would not even know (i.e., perceive) that the driven wheels 16, 18 had lost traction while traversing over the swale 3. Forward motion would remain smooth and uneventful. As the wheelchair 10 climbed out of the swale 3, the driven wheels 16, 18 would begin to engage with the surface as the additional driven wheels 38, 40 began to lose the weight that they were bearing. By the time the wheelchair 10 was fully to the right of the swale 3, the driven wheels 16, 18 would again be fully engaged with the surface and the additional driven wheels 38, 40 would, once again, be suspended about one-half of an inch (approximately) above the surface. The additional driven wheels 38, 40 also provide redundant differential steering that permits continuous steering capability while passing over the swale 3. This smooth transfer of motive force further contributes to a sense of security and well-being that is experienced by the user.

The instant invention also lends itself for use when other features are included with the wheelchair 10. For example, the ability to raise the seat of the wheelchair 10 from a sitting position sufficient to urge the person into a standing position, as was previously discussed in the "Field of the Invention" requires that the wheelchair 10 remain level and not tilt when the seat is either raised or lowered.

The instant wheelchair 10, if so equipped, will remain on the first plane 32 (assuming, of course, that the surface 35 the wheelchair 10 is disposed on is level) whether the seat and user are in a lowered position or in elevated position or anywhere between. This further illustrates the versatility and adaptability of the instant invention.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. An improvement to a powered wheelchair that includes at least three wheels and wherein two of said three wheels are driven wheels, and wherein a third of said at least three wheels is free spinning and wherein a bottom of said at least three wheels define a first plane, and wherein said bottom of said at least three wheels of said powered wheelchair are disposed on said first plane when said wheelchair is disposed on a generally planar and level surface, the improvement comprising:

including two additional driven wheels with said wheelchair in addition to said two driven wheels, and wherein said two additional driven wheels are disposed above said first plane, and wherein said two driven wheels each supply a motive force to urge said wheelchair on said level surface when said wheelchair is disposed on said first plane;

wherein said wheelchair is adapted to pivot about an axis passing through a center of said two driven wheels from said first plane to a second plane when said wheelchair is disposed on a generally planar and inclined surface that includes a sufficient degree of incline thereto, and wherein a bottom of said two driven wheels and a bottom of said two additional driven wheels define said second plane, and wherein said bottom of said two driven wheels and said bottom of said two additional driven wheels are disposed on said inclined surface when said wheelchair is disposed on said second plane, wherein when said wheelchair is disposed on said second plane said two driven wheels each supply a motive force to urge said wheelchair on said inclined surface, and wherein when said wheelchair is disposed on said second plane said two additional driven wheels each supply a motive force to urge said wheelchair on said inclined surface, and wherein when said wheelchair is disposed on said second plane said two driven wheels and said two additional driven wheels provide four-wheel drive capability for urging said wheelchair on said inclined surface when said wheelchair is disposed on said second plane;

wherein said two driven wheels include a left driven wheel and a right driven wheel, and wherein said two additional driven wheels include a left additional driven wheel and a right additional driven wheel, and wherein drive means is provided to mechanically link said left additional driven wheel to said left driven wheel and to mechanically link said right additional driven wheel to said right driven wheel sufficient so that said left additional driven wheel always rotates in a direction that is equal to that of said left driven wheel whenever said left driven wheel is rotating and wherein said right additional driven wheel always rotates in a direction that is equal to that of said right driven wheel whenever said right driven wheel is rotating;

wherein a first motive source that is used to rotate said left driven wheel independently with respect to said right driven wheel is also used to rotate said left additional driven wheel independently with respect to said right additional driven wheel, and wherein a second motive source that is used to rotate said right driven wheel independently with respect to said left driven wheel is also used to rotate said right additional driven wheel independently with respect to said left additional driven wheel;

wherein said first of said two driven wheels and said second of said two driven wheels provide differential steering of said wheelchair when said wheelchair is disposed on said first plane, and wherein said first of said two additional driven wheels and said second of said two additional driven wheels do not provide differential steering of said wheelchair when said wheelchair is disposed on said first plane;

wherein said first of said two driven wheels and said second of said two driven wheels provide differential steering of said wheelchair when said wheelchair is disposed on said second plane, and wherein said first of said two additional driven wheels and said second of said two additional driven wheels provide differential steering of said wheelchair when said wheelchair is disposed on said second plane; and wherein when said wheelchair is disposed on said inclined surface and on said second plane said third of said at least three wheels is not disposed on said inclined surface.

2. The improvement of claim 1 wherein said at least three wheels of said powered wheelchair includes four wheels and wherein said four wheels are disposed on said first plane when said wheelchair is disposed on said level surface.

3. The improvement of claim 2 wherein said four wheels include said at least two driven wheels.

4. The improvement of claim 3 wherein a center of said two driven wheels is disposed behind a center of a remaining two of said four wheels and wherein a center of said two additional driven wheels is disposed behind said axis passing through said center of said two driven wheels, and wherein said remaining two of said four wheels do not supply a motive force to urge said wheelchair on said surface.

5. The improvement of claim 4 wherein said center of said two additional driven wheels is disposed behind said axis passing through said center of said two driven wheels and wherein said two additional driven wheels are disposed between a track of said two driven wheels.

6. The improvement of claim 5 wherein said center of said two additional driven wheels are disposed behind said axis passing through said center of said two driven wheels, and wherein said two additional driven wheels are disposed between said track of said two driven wheels.

7. The improvement of claim 3 wherein said two additional driven wheels include a diameter that is the same as that of said two driven wheels, and wherein said two additional driven wheels are adapted to rotate at the same rate as said two driven wheels rotate.

8. The improvement of claim 3 wherein said two additional driven wheels include a diameter that is less than that of said two driven wheels, and wherein said two additional driven wheels are adapted to rotate at a greater rate than said two driven wheels rotate.

9. The improvement of claim 3 wherein said two additional driven wheels include a diameter that is greater than that of the two driven wheels, and wherein said two additional driven wheels are adapted to rotate at a slower rate than said two driven wheels rotate.

10. The improvement of claim 1 wherein a bottom of said pair of additional driven wheels and a bottom of said two driven wheels are disposed on said second plane when said wheelchair is disposed on said inclined surface.

11. The improvement of claim 1 wherein a center of said two additional driven wheels is disposed behind said axis passing through said center of said two driven wheels.

12. The improvement of claim 1 wherein a center of said two additional driven wheels is disposed forward of said axis passing through said center of said two driven wheels.

13. An improvement to a powered wheelchair that includes at least three wheels, wherein two of said at least three wheels are driven wheels, and wherein a third of said at least three wheels is free spinning, and wherein a bottom of said at least three wheels define a plane that said wheelchair is disposed in when said wheelchair is disposed on a planar and level surface, and wherein said two driven wheels include a left driven wheel and a right driven wheel, and the improvement comprising:

including a left additional driven wheel and wherein a center of said left additional driven wheel is disposed behind a center of said left driven wheel, and including means for mechanically coupling said left driven wheel of said wheelchair to said left additional driven wheel wherein said left additional driven wheel rotates in the same direction as said left driven wheel, and including a right additional driven wheel and wherein a center of said right additional driven wheel is disposed behind a center of said right driven wheel, and including means for mechanically coupling said right driven wheel of said wheelchair to said right additional driven wheel wherein said right additional driven wheel rotates in the same direction as said right driven wheel;

wherein said wheelchair is adapted to pivot about an axis passing through a center of said two driven wheels from said first plane to a second plane when said wheelchair is disposed on a generally planar and inclined surface that includes a sufficient degree of incline thereto, and wherein a bottom of said two driven wheels and a bottom of said left additional driven wheel and said right additional driven wheel define said second plane, and wherein said bottom of said two driven wheels and said bottom of said left additional driven wheel and said right additional driven wheel are disposed on said inclined surface when said wheelchair is disposed on said second plane, wherein when said wheelchair is disposed on said second plane said two driven wheels each supply a motive force to urge said wheelchair on said inclined surface, and wherein when said wheelchair is disposed on said second plane said left additional driven wheel and said right additional driven wheel each supply a motive force to urge said wheelchair on said inclined surface, and wherein when said wheelchair is disposed on said second plane said two driven wheels and said right additional driven wheel and said left additional driven wheel provide four-wheel drive capability for urging said wheelchair on said inclined surface when said wheelchair is disposed on said second plane;

wherein a first motive source that is used to rotate said left driven wheel independently with respect to said right driven wheel is also used to rotate said left additional driven wheel independently with respect to said right additional driven wheel, and wherein a second motive source that is used to rotate said right driven wheel independently with respect to said left driven wheel is also used to rotate said right additional driven wheel independently with respect to said left additional driven wheel;

wherein said left driven wheel and said right driven wheel provide differential steering of said wheelchair when said wheelchair is disposed on said first plane, and wherein said left additional driven wheel and said right additional driven wheel do not provide differential steering of said wheelchair when said wheelchair is disposed on said first plane;

wherein said left driven wheel and said right driven wheels provide differential steering of said wheelchair when said wheelchair is disposed on said second plane, and wherein said left additional driven wheel and said right additional driven wheel provide differential steering of said wheelchair when said wheelchair is disposed on said second plane; and wherein when said wheelchair is disposed on said inclined surface and on said second plane said third of said at least three wheels is not disposed on said inclined surface.

14. A method for increasing the versatility of a self-propelled type of wheelchair that includes at least three wheels and wherein two of said three wheels are driven wheels and wherein a third of said at least three wheels is free spinning, and wherein a bottom of said at least three wheels are disposed on a first plane and wherein said bottom of said at least three wheels define said first plane and wherein when said wheelchair is disposed on a level surface it is disposed in said first plane, the method being comprised of the steps of:

providing two additional driven wheels with said wheelchair in addition to said two driven wheels; and elevating said additional driven wheels above said first plane when said wheelchair is disposed in said first plane;

wherein said two additional driven wheels are disposed above said first plane, and wherein said two driven wheels each supply a motive force to urge said wheelchair on said level surface when said wheelchair is disposed on said first plane;

wherein said wheelchair is adapted to pivot about an axis passing through a center of said two driven wheels from said first plane to a second plane when said wheelchair is disposed on a generally planar and inclined surface that includes a sufficient degree of incline thereto, and wherein a bottom of said two driven wheels and a bottom of said two additional driven wheels define said second plane, and wherein said bottom of said two driven wheels and said bottom of said two additional driven wheels are disposed on said inclined surface when said wheelchair is disposed on said second plane, wherein when said wheelchair is disposed on said second plane said two driven wheels each supply a motive force to urge said wheelchair on said inclined surface, and wherein when said wheelchair is disposed on said second plane said two additional driven wheels each supply a motive force to urge said wheelchair on said inclined surface, and wherein when said wheelchair is disposed on said second plane said two driven wheels and said two additional driven wheels provide four-wheel drive capability for urging said wheelchair on said inclined surface when said wheelchair is disposed on said second plane;

wherein said two driven wheels include a left driven wheel and a right driven wheel, and wherein said two additional driven wheels include a left additional driven wheel and a right additional driven wheel, and wherein first drive means is provided to mechanically link said left additional driven wheel to said left driven wheel and second drive means is provided to mechanically link said right additional driven wheel to said right driven wheel sufficient so that said left additional driven wheel always rotates in a direction that is equal to that of said left driven wheel whenever said left driven wheel is rotating and wherein said right additional driven wheel always rotates in a direction that is equal to that of said right driven wheel whenever said right driven wheel is rotating;

wherein a first motive source that is used to rotate said left driven wheel independently with respect to said right driven wheel is also used to rotate said left additional driven wheel independently with respect to said right additional driven wheel, and wherein a second motive source that is used to rotate said right driven wheel independently with respect to said left driven wheel is also used to rotate said right additional driven wheel independently with respect to said left additional driven wheel;

wherein said first of said two driven wheels and said second of said two driven wheels provide differential steering of said wheelchair when said wheelchair is disposed on said first plane, and wherein said first of said two additional driven wheels and said second of said two additional driven wheels do not provide differential steering of said wheelchair when said wheelchair is disposed on said first plane;

wherein said first of said two driven wheels and said second of said two driven wheels provide differential steering of said wheelchair when said wheelchair is disposed on said second plane, and wherein said first of said two additional driven wheels and said second of said two additional driven wheels provide differential steering of said wheelchair when said wheelchair is disposed on said second plane; and wherein when said wheelchair is disposed on said inclined surface and on said second plane said third of said at least three wheels is not disposed on said inclined surface.

* * * * *